US010444495B2

(12) United States Patent
Fujimoto et al.

(10) Patent No.: US 10,444,495 B2
(45) Date of Patent: Oct. 15, 2019

(54) VIBRATION DEVICE, METHOD OF DRIVING THE SAME, AND CAMERA

(71) Applicant: Murata Manufacturing Co., Ltd., Nagaokakyo-shi, Kyoto-fu (JP)

(72) Inventors: Katsumi Fujimoto, Nagaokakyo (JP); Shinsuke Ikeuchi, Nagaokakyo (JP); Kenji Nishiyama, Nagaokakyo (JP); Masanobu Nomura, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/008,071

(22) Filed: Jun. 14, 2018

(65) Prior Publication Data

US 2018/0292646 A1 Oct. 11, 2018

Related U.S. Application Data

(63) Continuation of application No. PCT/JP2017/000467, filed on Jan. 10, 2017.

(30) Foreign Application Priority Data

Mar. 3, 2016 (JP) ................................. 2016-040994

(51) Int. Cl.
*G02B 27/00* (2006.01)
*G03B 17/08* (2006.01)
(Continued)

(52) U.S. Cl.
CPC ......... *G02B 27/0006* (2013.01); *G03B 17/02* (2013.01); *G03B 17/08* (2013.01);
(Continued)

(58) Field of Classification Search
None
See application file for complete search history.

(56) References Cited

U.S. PATENT DOCUMENTS 10,156,719 B2 * 12/2018 Fujimoto ............... G03B 17/02
10,268,039 B2 * 4/2019 Nishiyama ......... G02B 27/0006
(Continued)

FOREIGN PATENT DOCUMENTS

JP 2003-330082 A 11/2003
JP 2004-064555 A 2/2004
(Continued)

OTHER PUBLICATIONS

Official Communication issued in International Patent Application No. PCT/JP2017/000467, dated Apr. 11, 2017.

*Primary Examiner* — Clayton E. LaBalle
*Assistant Examiner* — Dennis Hancock
(74) *Attorney, Agent, or Firm* — Keating & Bennett, LLP

(57) ABSTRACT

A vibration device includes a cylindrical vibration body portion including a cylindrical member and a piezoelectric vibrator fixed to the cylindrical member, and a light-transparent body portion that includes an outer peripheral portion connected to an end surface of the cylindrical member and a light-transparent portion positioned in front of a lens. The light-transparent body portion vibrates in a bending mode by vibration of the cylindrical vibration body portion. The bending mode includes a first bending mode in which a center-maximum-displacement portion of the light-transparent body portion and the outer peripheral portion of the light-transparent body portion connected to the end surface are displaced in the same direction and a second bending mode in which the center-maximum-displacement portion of the light-transparent body portion and the outer peripheral portion of the light-transparent body portion are displaced in opposite directions.

20 Claims, 13 Drawing Sheets

(51) Int. Cl.
  *G03B 17/56* (2006.01)
  *H04N 5/225* (2006.01)
  *G03B 17/02* (2006.01)

(52) U.S. Cl.
  CPC ......... *G03B 17/568* (2013.01); *H04N 5/2253* (2013.01); *H04N 5/22521* (2018.08); *G03B 2205/0061* (2013.01)

(56) References Cited

U.S. PATENT DOCUMENTS

| | | | |
|---|---|---|---|
| 2003/0214588 A1 | 11/2003 | Takizawa et al. | |
| 2004/0047625 A1 | 3/2004 | Ito et al. | |
| 2012/0099198 A1 | 4/2012 | Sunaga | |
| 2012/0243093 A1* | 9/2012 | Tonar | H01L 41/0973 359/507 |
| 2014/0036084 A1 | 2/2014 | Lu | |
| 2014/0043515 A1* | 2/2014 | Nitto | H02N 2/103 348/333.01 |
| 2015/0035906 A1* | 2/2015 | Mizuno | H01L 41/0926 347/50 |
| 2015/0349236 A1* | 12/2015 | Furuta | B41J 2/14233 348/208.11 |
| 2016/0266379 A1* | 9/2016 | Li | G02B 27/0006 |
| 2018/0239218 A1* | 8/2018 | Ikeuchi | G03B 17/08 |

FOREIGN PATENT DOCUMENTS

| | | |
|---|---|---|
| JP | 2007-082062 A | 3/2007 |
| JP | 2012-090090 A | 5/2012 |
| JP | 2012-138768 A | 7/2012 |
| JP | 2013-080177 A | 5/2013 |

\* cited by examiner

VIBRATION DEVICE, METHOD OF DRIVING THE SAME, AND CAMERA

CROSS REFERENCE TO RELATED APPLICATIONS

This application claims the benefit of priority to Japanese Patent Application No. 2016-040994 filed on Mar. 3, 2016 and is a Continuation Application of PCT Application No. PCT/JP2017/000467 filed on Jan. 10, 2017. The entire contents of each application are hereby incorporated herein by reference.

BACKGROUND OF THE INVENTION

1. Field of the Invention

The present invention relates to a vibration device used for a camera body that includes a lens, a method of driving the vibration device, and a camera.

2. Description of the Related Art

Cameras to be mounted on vehicles and cameras to be installed outside houses are exposed to rain. Thus, a cover made of glass or transparent plastic is provided in front of a lens. However, when a waterdrop adheres to such a cover, the field of view becomes unclear.

Japanese Unexamined Patent Application Publication No. 2012-138768 discloses a dome-shaped cover that is used for an application such as that mentioned above. A cylinder portion is connected to the dome-shaped cover. A piezoelectric vibrator is attached to the cylinder portion. When a waterdrop adheres to the dome-shaped cover, the cylinder portion and the dome-shaped cover are made to vibrate by the piezoelectric vibrator. As a result, the waterdrop is removed from the dome-shaped cover. Japanese Unexamined Patent Application Publication No. 2012-138768 describes that, by changing a node position of vibration in the dome-shaped cover, a position at which a liquid droplet is atomized is able to be changed.

In Japanese Unexamined Patent Application Publication No. 2007-82062, an ultrasonic transducer, an adhesive layer, and an external lens are disposed in front of a camera body. By driving the ultrasonic transducer, the external lens is vibrated. As a result, a waterdrop that has adhered to the external lens is removed from the external lens.

In Japanese Unexamined Patent Application Publication No. 2012-138768 and Japanese Unexamined Patent Application Publication No. 2007-82062, in order to remove a waterdrop with certainty, it is necessary to cause the dome-shaped cover and the external lens to vibrate to a large extent. On the other hand, in Japanese Unexamined Patent Application Publication No. 2012-138768, when trying to cause the dome-shaped cover to vibrate to a large extent, there is a possibility that the dome-shaped cover and the cylinder portion will be separated from each other at a joint interface therebetween.

Also in Japanese Unexamined Patent Application Publication No. 2007-82062, when large vibration is generated in the ultrasonic transducer in order to cause the external lens to vibrate to a large extent, there is a possibility that the external lens and the ultrasonic transducer will be separated from each other at a joint interface therebetween.

SUMMARY OF THE INVENTION

Preferred embodiments of the present invention provide vibration devices capable of obtain a large amplitude while reducing or preventing separation at a joint interface, and methods of driving the vibration devices.

A vibration device according to a preferred embodiment of the present invention is a vibration device used for a camera body that includes a lens, and the vibration device includes a cylindrical vibration body portion including a cylindrical member that includes a first end portion, a second end portion, an end surface surrounding an opening at the first end portion, and a thinned-wall portion having a thickness on the first end portion side that is smaller than a thickness of the second end portion, and a piezoelectric vibrator, and a light-transparent body portion that includes an outer peripheral portion connected to the end surface of the cylindrical member such that the light-transparent body portion covers the opening and a light-transparent portion positioned in front of the lens. The light-transparent body portion is structured to vibrate in a bending mode by vibration of the cylindrical vibration body portion. The bending mode includes a first mode in which a center portion of the light-transparent body portion that is displaced to the largest extent when the light-transparent body portion vibrates in the bending mode and the outer peripheral portion of the light-transparent body portion that is connected to the end surface are displaced in the same or substantially the same direction in a Z direction defined as a direction of the central axis of the cylindrical vibration body portion, and a second mode in which the center portion of the light-transparent body portion and the outer peripheral portion of the light-transparent body portion are displaced in opposite directions. The outer peripheral portion of the light-transparent body portion is connected to the end surface of the cylindrical vibration body portion such that a node in the first mode and a node in the second mode are located within a joint interface between the end surface and the outer peripheral portion.

In a vibration device according to a preferred embodiment of the present invention, the piezoelectric vibrator is disposed such that the cylindrical vibration body portion is displaced in the Z direction.

In a vibration device according to a preferred embodiment of the present invention, the cylindrical member includes a cylindrical main body and a cylindrical mode-conversion coupling portion that is connected to the cylindrical main body and that includes the thinned-wall portion. An end portion of the mode-conversion coupling portion, opposite to an end portion of the mode-conversion coupling portion that is connected to the cylindrical main body, is a first end portion including the opening and the end surface. In this case, an amplitude at the light-transparent body portion is able to be further increased.

In a vibration device according to a preferred embodiment of the present invention, the piezoelectric vibrator has a cylindrical or substantially cylindrical shape.

In a vibration device according to a preferred embodiment of the present invention, the cylindrical vibration body portion has a cylindrical or substantially cylindrical shape. In this case, not only vibration of the cylindrical vibration body portion in the Z direction but also breathing vibration is able to be utilized.

A method of driving a vibration device according to a preferred embodiment of the present invention includes vibrating the light-transparent body portion in at least one of the first mode and the second mode and driving the vibration device such that a node of vibration in the first mode and a node of vibration in the second mode are located within the joint interface.

In a method of driving a vibration device according to a preferred embodiment of the present invention, the light-transparent body portion is vibrated in at least one of the first mode and the second mode such that a difference between a resonant frequency in the first mode and a resonant frequency in the second mode is reduced.

In a method of driving a vibration device according to a preferred embodiment of the present invention, a process of vibrating the light-transparent body portion in the first mode and a process of vibrating the light-transparent body portion in the second mode are alternately repeated.

A camera according to a preferred embodiment of the present invention includes a vibration device according to a preferred embodiment of the present invention.

With vibration devices and methods of driving vibration devices according to preferred embodiments of the present invention, separation at a joint surface is able to be effectively reduced or prevented. Therefore, light-transparent body portions are able to be vibrated with a larger amplitude.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Specific preferred embodiments of the present invention will be described below with reference to the drawings in order to clarify the present invention.

Note that the preferred embodiments described in the present specification are examples, and it is to be noted that the configurations according to the different preferred embodiments may be partially replaced with one another or may be combined with each other.

Figure 1:
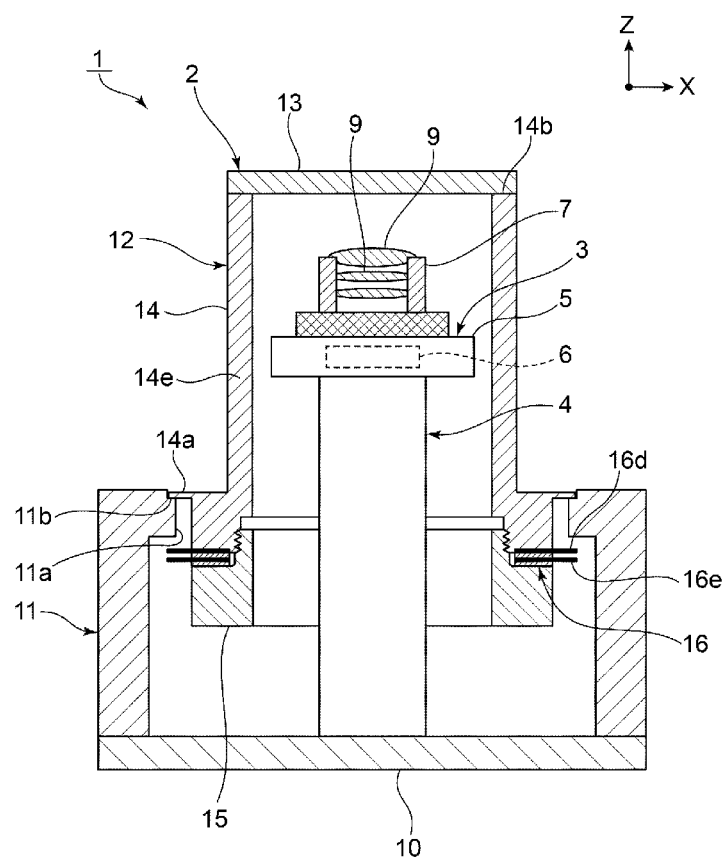
FIG. 1 is a schematic sectional front view of a camera that includes a vibration device according to a first preferred embodiment of the present invention.
Figure 2:
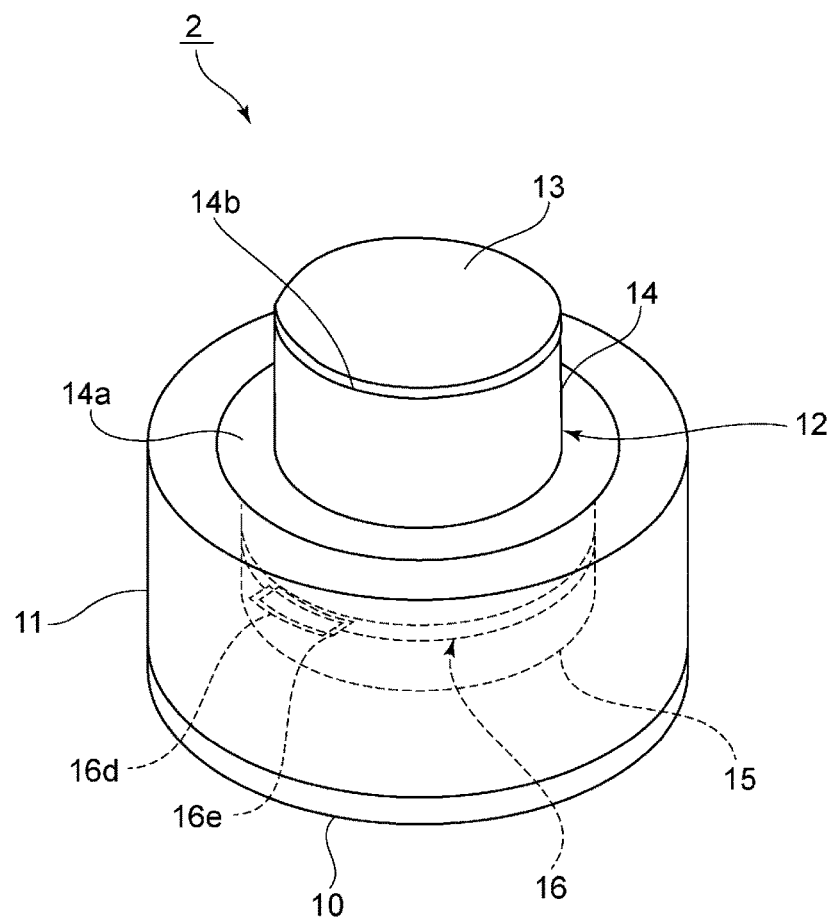
FIG. 2 is a perspective view of the vibration device used in the first preferred embodiment of the present invention.

FIG. 1 is a schematic sectional front view of a camera that includes a vibration device according to a first preferred embodiment of the present invention. FIG. 2 is a perspective view of the vibration device. A camera 1 includes a vibration device 2. A camera body 3 is disposed in the vibration device 2.

The camera body 3 includes a main body 4 having a cylindrical or substantially cylindrical shape. A lower end portion of the main body member 4 is fixed to a base plate 10. An image-capturer 5 is fixed to an upper end portion of the main body member 4. A circuit 6 including an imaging element is built into the image-capturer 5. A lens module 7 is fixed in place so as to face the image-capturer 5. The lens module 7 includes a cylindrical or substantially cylindrical body, and a plurality of lenses 9 are provided in the lens module 7.

The structure of the camera body 3 is not particularly limited as long as an image of an image-capturing target positioned in front of the lenses 9 is able to be captured.

The vibration device 2 includes a cylindrical case member 11, a cylindrical vibration body portion 12, and a light-transparent body portion 13. The cylindrical case member 11 preferably has a cylindrical or substantially cylindrical shape. The case member 11 may have a different shape, such as a square cylindrical or substantially square cylindrical shape. The case member 11 is preferably made of, for example, a metal or a synthetic resin.

A lower end portion of the case member 11 is fixed to the base plate 10. An annular projecting portion 11a is provided on the upper end side of the case member 11. The annular projecting portion 11a projects inward in a radial direction of the case member 11. An annular recess 11b is provided in a top surface of the projecting portion 11a.

The cylindrical vibration body portion 12 includes a cylindrical or substantially cylindrical member 14, a fixing member 15 having a cylindrical or substantially cylindrical shape, and a piezoelectric vibrator 16. The piezoelectric vibrator 16 is preferably a piezoelectric vibration element having a cylindrical or substantially cylindrical shape and is defined by, for example, a langevin transducer or other suitable transducer.

An upper end portion of the fixing member 15 is screwed in a lower end portion of the cylindrical member 14. As a result, the piezoelectric vibrator 16 having a cylindrical or substantially cylindrical shape is fixed in place by being sandwiched between a top surface of the fixing member 15 and a bottom surface of the cylindrical member 14. The cylindrical member 14 and the fixing member 15 are each preferably made of a metal or a synthetic resin, for example.

Figure 3:
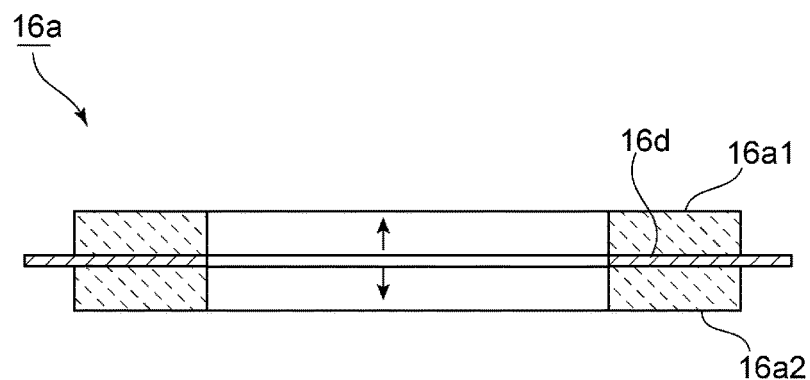
FIG. 3 is a sectional front view of a piezoelectric vibrator used in the first preferred embodiment of the present invention.

The piezoelectric vibrator 16 having a cylindrical or substantially cylindrical shape includes an annular piezoelectric element 16a. As illustrated in FIG. 3, the annular piezoelectric element 16a includes annular piezoelectric plates 16a1 and 16a2. The polarization directions of the piezoelectric plates 16a1 and 16a2 are indicated by arrows in FIG. 3. In other words, in a thickness direction, the polarization direction of the piezoelectric plate 16a1 and the polarization direction of the piezoelectric plate 16a2 are opposite to each other. A terminal 16d having a cylindrical or substantially cylindrical shape is sandwiched between the piezoelectric plates 16a1 and 16a2. In addition, a terminal 16e having a cylindrical or substantially cylindrical shape is sandwiched between the piezoelectric plate 16a1 and a second cylinder member.

The piezoelectric plates 16a1 and 16a2 are each preferably made of, for example, a lead zirconate titanites-based piezoelectric ceramic. A different piezoelectric ceramic or a piezoelectric single crystal may also be used. Electrodes (not illustrated) are provided on the two surfaces of each of the piezoelectric plates 16a1 and 16a2.

Returning to FIG. 1, the cylindrical member 14 includes a flange portion 14a projecting outward in the radial direction. The cylindrical member 14 is fixed to the case member 11 such that a bottom surface of the flange portion 14a is positioned in the recess 11b.

The cylindrical member 14 includes a first end portion and a second end portion in a direction of the central axis of the cylindrical vibration body portion 12 (the Z direction). In the first end portion, the cylindrical member 14 includes an end surface 14b. The end surface 14b has an annular shape and surrounds an opening that is located on the side on which the first end portion of the cylindrical member 14 is located. An outer peripheral portion of the light-transparent body portion 13 having a flat plate shape is bonded to the end surface 14b. Although not illustrated, this bonding is preferably performed by a suitable bonding method using a bonding material, such as an adhesive, for example. Thus, the end surface 14b defines a joint interface. The cylindrical member 14 includes a thinned-wall portion 14e that is located on the first end portion side and that has a thickness smaller than that of the second end portion. The thinned-wall portion 14e defines a mode-conversion coupling portion and increases an amplitude.

The light-transparent body portion 13 is preferably made of glass, for example, and the entire or substantially the entire light-transparent body portion 13 preferably has light transparency. Only a portion of the light-transparent body portion 13 that is located in front of the lenses 9, that is, only a portion of the light-transparent body portion 13 that corresponds to the visual field range of the camera may have light transparency.

The material of the light-transparent body portion 13 is not limited to glass, and light-transparent plastic or other suitable materials may be used.

The light-transparent body portion 13 is located in front of one of the lenses 9 that is located at the forefront of the camera body 3.

Due to vibration of the piezoelectric vibrator 16, the cylindrical vibration body portion 12, to which the piezoelectric vibrator 16 is attached, vibrates so as to expand and contract in the Z direction in FIG. 1. The Z direction in FIG. 1 is a direction from the cylindrical vibration body portion 12 towards the light-transparent body portion 13 in the direction of the central axis of the cylindrical vibration body portion 12. A reverse phase direction in FIG. 1 is a direction perpendicular or substantially perpendicular to the Z direction and will be referred to as the X direction from the left side toward the right side of FIG. 1. In this case, vibration of the cylindrical vibration body portion 12 is not particularly limited as long as the vibration involves displacement in the Z direction. For example, the piezoelectric vibrator 16 may be in a vibration mode, such as the breathing vibration mode, in which a decreased diameter state and an increased diameter state alternate. Also in this case, as a result, the end surface 14b of the cylindrical vibration body portion 12 is repeatedly displaced in the Z direction. In the direction of the central axis of the cylindrical member 14, the side on which the end surface 14b, which is positioned at the first end portion, is present will be referred to as a front side in the Z direction, and the side on which the second end portion, which is opposite to the first end portion, is present will be referred to as a rear side in the Z direction.

In the vibration device 2, displacement of the end surface 14b of the cylindrical member 14 repeatedly occurs between a vibration mode in which the end surface 14b is located on the front side in the Z direction and another vibration mode in which the end surface 14b is located on the rear side in the Z direction. As a result, the light-transparent body portion 13 vibrates in a bending mode. This vibration in the bending mode enables a waterdrop that has adhered to the outer surface of the light-transparent body portion 13 to be atomized and removed from the outer surface.

In the vibration device 2, the light-transparent body portion 13 is fixed to the end surface 14b of the cylindrical member 14 such that a node of the vibration in the bending mode is located at the joint interface. Further details of this matter will now be described.

As described above, when the light-transparent body portion 13 vibrates in the bending mode due to vibration of the cylindrical member 14, a center portion of a main surface of the light-transparent body portion 13 is displaced to the largest extent. This portion that is displaced to the largest extent will be referred to as a center-maximum-displacement portion. The outer peripheral portion, which is bonded to the end surface 14b of the cylindrical member 14, is displaced to the smallest extent.

In this case, there are first and second bending modes which will be described below.

Displacement in the first bending mode and displacement in the second bending mode will now be described with reference to FIG. 4 to FIG. 6.

Figure 4:
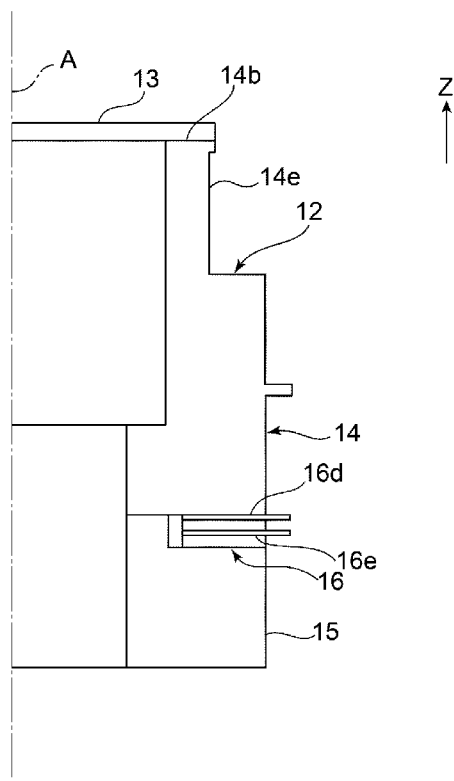
FIG. 4 is a schematic sectional front view illustrating the right half of a connection structure between a light-transparent body portion and a cylindrical vibration body portion in the first preferred embodiment of the present invention.

FIG. 4 is a schematic sectional front view illustrating the right half of a connection structure between the cylindrical vibration body portion 12 and the light-transparent body portion 13. In FIG. 4, the hatching is omitted. This is because hatching is used to illustrate a displacement distribution in each of FIG. 5 and FIG. 6 which will be described below. FIG. 4 illustrates only a portion of the cylindrical vibration body portion 12 and a portion of the light-transparent body portion 13 that are located on the right side of the one-dot chain line A. FIG. 4 illustrates a stationary state.

Figure 5:
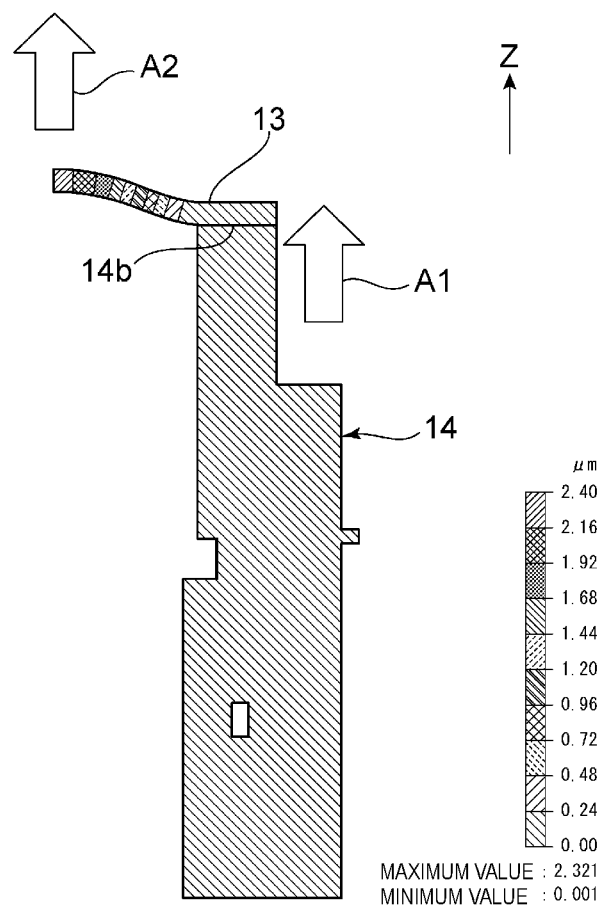
FIG. 5 is a diagram illustrating a displacement distribution when the light-transparent body portion performs bending vibration in a first mode.

FIG. 5 illustrates a displacement distribution when the light-transparent body portion 13 performs bending vibration in the first bending mode. Note that the displacement distribution illustrated in FIG. 5 and the displacement distribution illustrated in FIG. 6 each indicate that the amounts of displacement in regions illustrated by different hatching patterns in FIG. 5 and FIG. 6 correspond to values on a corresponding one of the scales illustrated on the right side in FIG. 5 and FIG. 6. In the first mode, in the Z direction, when the end surface 14b is displaced towards the front side in the Z direction, the center-maximum-displacement portion is displaced in the same direction as indicated by arrow A2. In the first bending mode, the end surface 14b and the center-maximum-displacement portion of the light-transparent body portion 13 are displaced in phase in the Z direction. In this case, as is clear from FIG. 5, the end surface 14b, that is, the joint interface is displaced to only a small extent. Consequently, in the first bending mode, a node of vibration is located within the joint interface.

Figure 6:
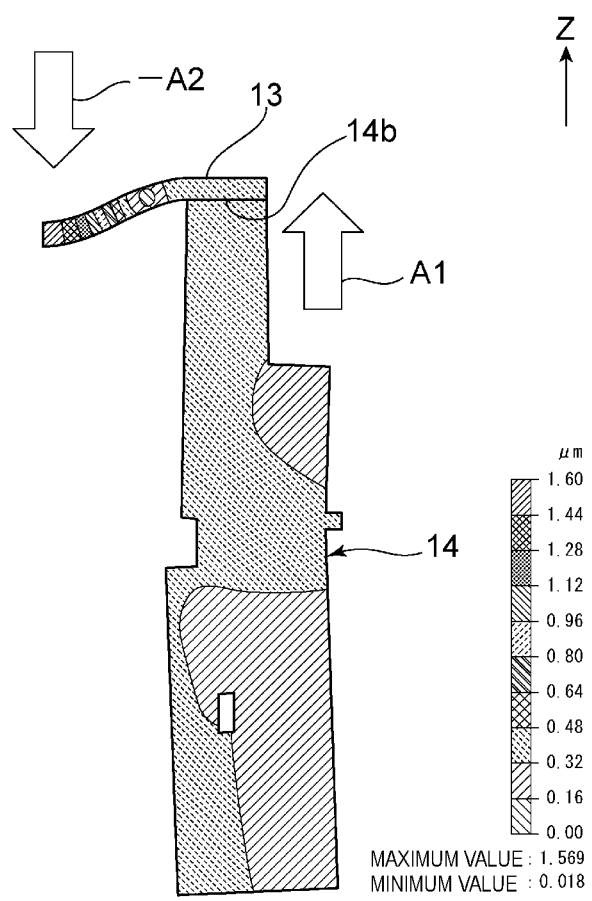
FIG. 6 is a diagram illustrating a displacement distribution when the light-transparent body portion performs bending vibration in a second mode.

In contrast, FIG. 6 is a diagram illustrating the displacement distribution in the second bending mode. As indicated by arrow A1 in FIG. 6, when the end surface 14b is displaced towards the front side in the Z direction, in the second bending mode, the center-maximum-displacement portion of the light-transparent body portion 13 is displaced towards the rear side in the Z direction as indicated by arrow −A2. In other words, the end surface 14b and the center-maximum-displacement portion of the light-transparent body portion 13 are displaced in opposite phases in the Z direction.

Note that, in FIG. 6, the end surface 14b, that is, the joint interface is displaced, and a node of vibration is not located at the joint interface. The displacement distribution illustrated in FIG. 6 is not a displacement distribution according to the present preferred embodiment. A feature of the present preferred embodiment is that the light-transparent body portion 13 is fixed to the cylindrical vibration body portion 12 such that a node of vibration in the first bending mode and a node of vibration in the second bending mode are both located at the joint interface. Further details of this matter will be described below.

Figure 7:
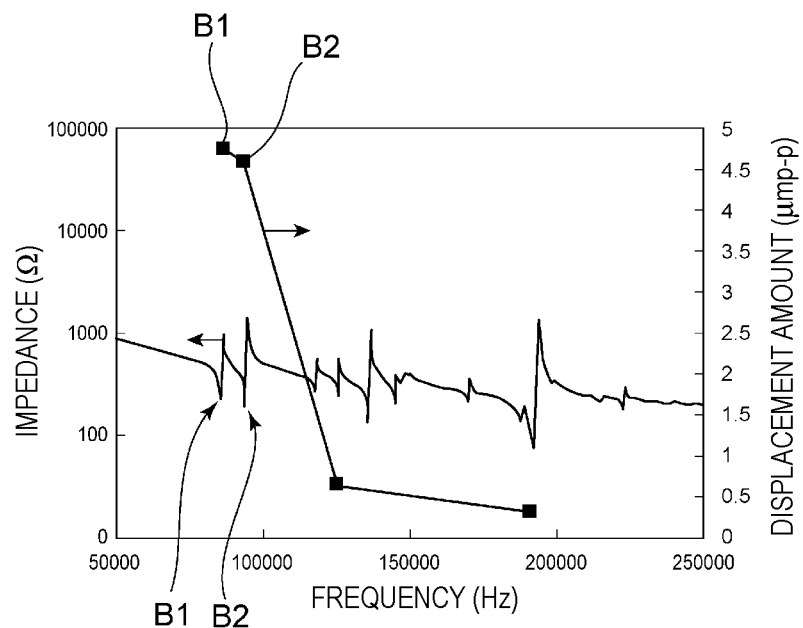
FIG. 7 is a graph of resonance characteristics in the vibration device according to the first preferred embodiment of the present invention and a relationship between the amount of displacement of the light-transparent body portion and frequency.
Figure 8:
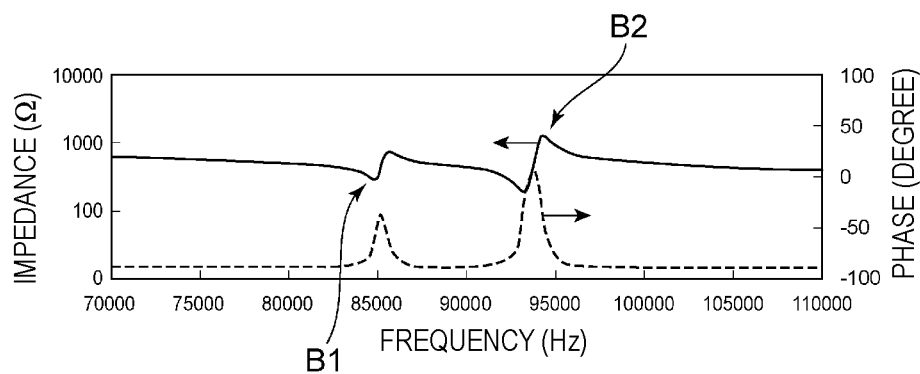
FIG. 8 is a graph of a principal portion of the resonance characteristics illustrated in FIG. 7 and phase characteristics.

FIG. 7 illustrates resonance characteristics when the piezoelectric vibrator is driven so as to vibrate in the vibration device 2 according to the first preferred embodiment and a relationship between the amount of displacement of the light-transparent body portion and frequency. FIG. 8 illustrates, in an enlarged manner, a principal portion of the resonance characteristics illustrated in FIG. 7 and also illustrates phase characteristics.

In FIG. 7 and FIG. 8, arrow B1 indicates the resonance characteristics in the first bending mode, and arrow B2 indicates the resonance characteristics in the second bending mode. Among the amounts of displacement in FIG. 8, the amounts of displacement each of which is at a frequency ranging from about 80,000 Hz to about 100,000 Hz indicate the amount of displacement in the first bending mode and the amount of displacement in the second bending mode.

Figure 9:
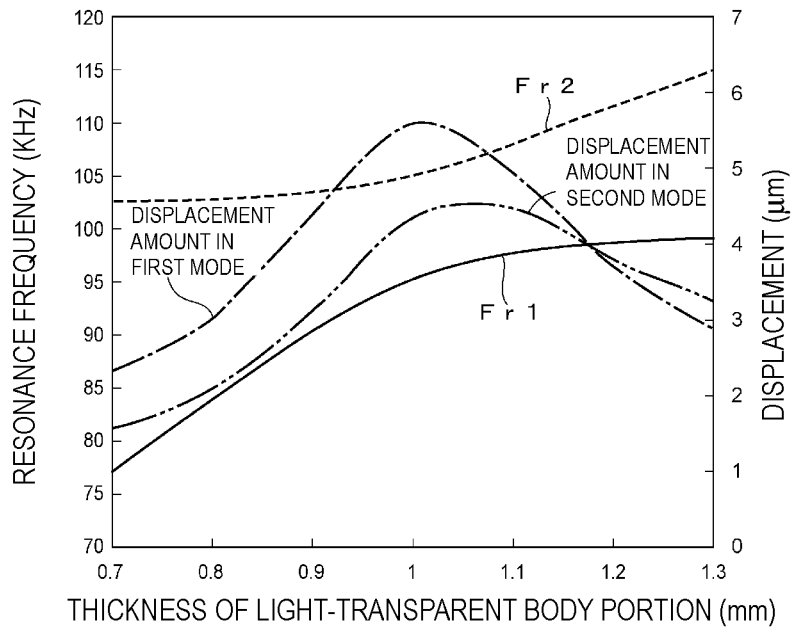
FIG. 9 is a graph of the thickness of the light-transparent body portion, a relationship between a resonant frequency and displacement in the first mode, and a relationship between a resonant frequency and displacement in the second mode.
Figure 10:
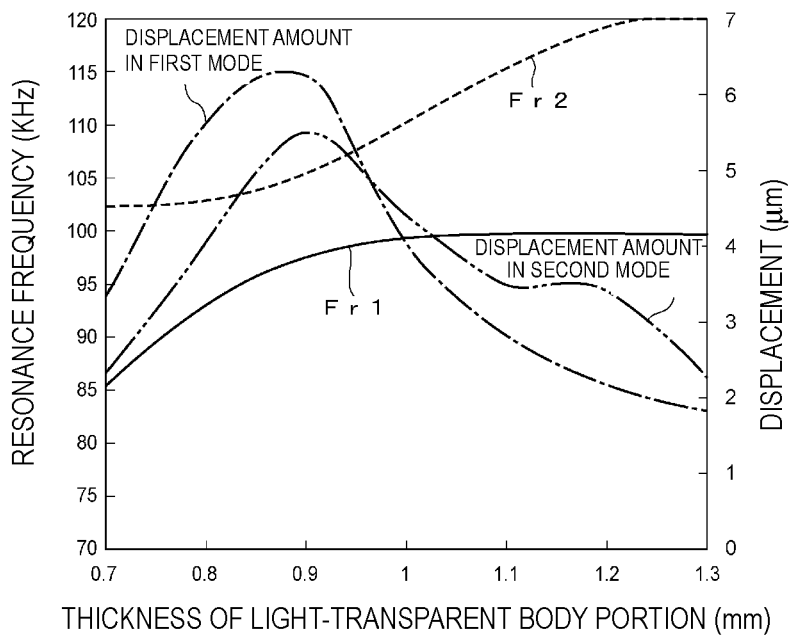
FIG. 10 is a graph of the thickness of the light-transparent body portion, a relationship between a resonant frequency and displacement in the first mode, and a relationship between a resonant frequency and displacement in the second mode.

In view of the fact that the first bending mode and the second bending mode are provided, the inventors of preferred embodiments of the present invention conducted various experiments by changing the thickness of the light-transparent body portion 13 and the length and the inner diameter of the cylindrical member 14. FIG. 9 illustrates results when the length of the cylindrical member 14 and a radius R of the opening are about 21.1 mm and about 4.5 mm, respectively. FIG. 10 illustrates results when the length of the cylindrical member 14 and the radius R of the opening are about 21.1 mm and about 4.25 mm, respectively.

In FIG. 9 and FIG. 10, a resonant frequency in the first bending mode is denoted by reference sign Fr1, and a resonant frequency in the second bending mode is denoted by reference sign Fr2.

As is clear from FIG. 9 and FIG. 10, it is understood that the resonant frequency Fr1 in the first bending mode, the resonant frequency Fr2 in the second bending mode, the amount of displacement in the first bending mode, and the amount of displacement in the second bending mode change when the thickness of the light-transparent body portion 13 is changed and when the radius R of the opening is changed. In addition, by adjusting the thickness of the light-transparent body portion, the radius R of the opening, the length of the cylindrical member 14, which is a dimension of the cylindrical member 14 in the Z direction, the material of the light-transparent body portion 13, and the material of the cylindrical member 14, a node of vibration is able to be positioned within the joint interface not only in the first bending mode but also in the second bending mode.

Figure 11:
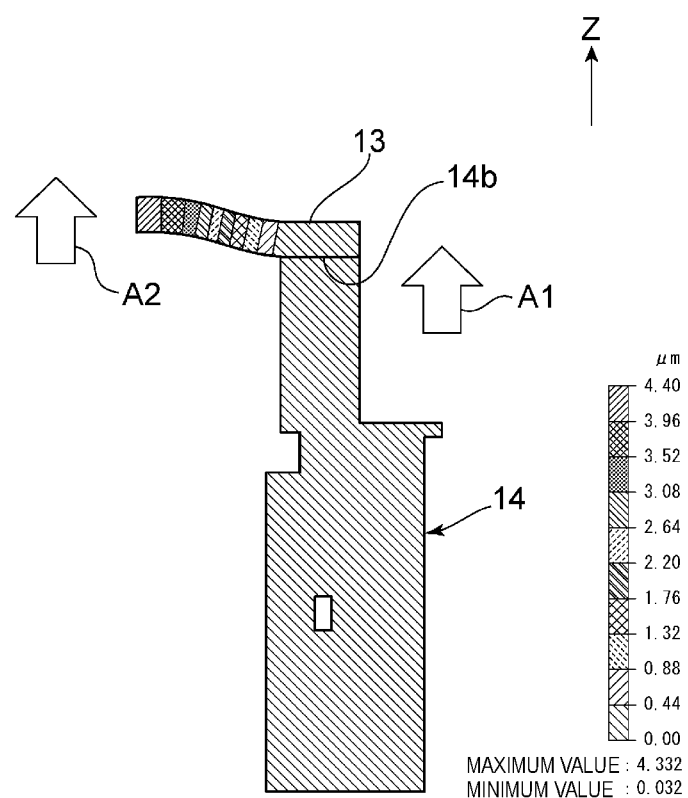
FIG. 11 is a schematic sectional front view illustrating a displacement distribution when the light-transparent body portion according to the first preferred embodiment of the present invention vibrates in the first mode.
Figure 12:
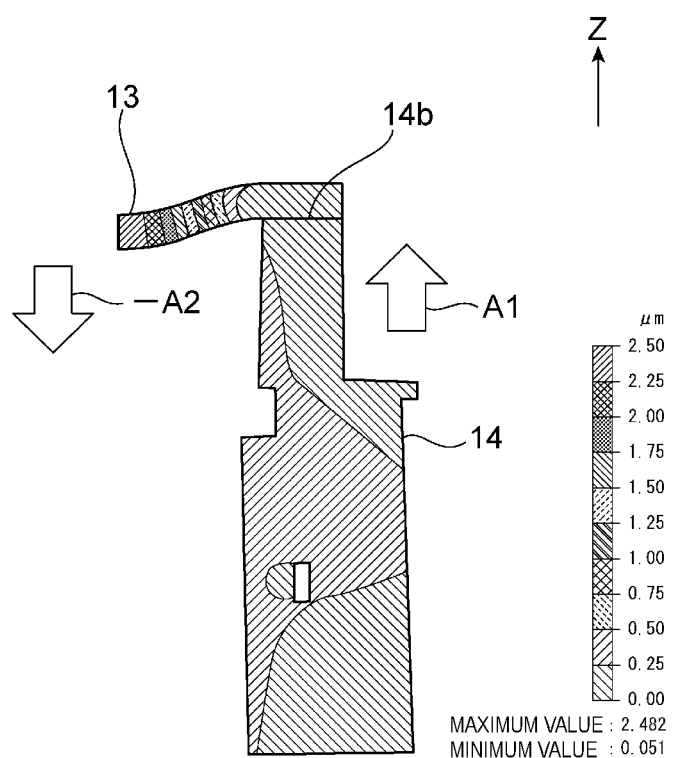
FIG. 12 is a schematic sectional front view illustrating a displacement distribution when the light-transparent body portion according to the first preferred embodiment of the present invention vibrates in the second mode.

FIG. 11 is a schematic sectional front view illustrating a displacement distribution in the first bending mode according to the first preferred embodiment, and FIG. 12 is a schematic sectional front view illustrating a displacement distribution in the second bending mode. As illustrated in FIG. 11, in the first mode, the cylindrical member 14 and the center-maximum-displacement portion of the light-transparent body portion 13 expand and contract in phase in the Z direction as indicated by arrows A1 and A2. In addition, as is clear from FIG. 11, the end surface 14b at the joint interface is displaced to only a small extent, and a node of vibration is located within the joint interface.

As illustrated in FIG. 12, in the second bending mode, the cylindrical member 14 and the center-maximum-displacement portion of the light-transparent body portion 13 are displaced in opposite phases in the Z direction as indicated by arrows A1 and −A2. In addition, in FIG. 12, the joint interface is displaced to only a small extent, and consequently, it is understood that a node of vibration is located within the joint interface also in the second bending mode.

In the present preferred embodiment, preferably, the cylindrical member 14 is made of stainless steel SUS304 and the length of the cylindrical member 14 is set to about 21.1 mm, for example. Preferably, the light-transparent body portion 13 is made of glass, and the thickness of the light-transparent body portion 13 was set to about 1.1 mm, for example. The inner diameter of the radius surrounded by the end surface 14b was preferably set to about 4.5 mm, for example.

As described above, by adjusting dimensions, such as thickness and length in accordance with the materials of the cylindrical member 14 and the light-transparent body portion 13, a node of vibration in the first bending mode and a node of vibration in the second bending mode are both able to be located at the joint interface.

Accordingly, in the vibration device according to the present preferred embodiment, when the vibration device is driven, separation of the light-transparent body portion 13 and the cylindrical member 14 from each other at the joint interface therebetween is less likely to occur. Thus, the light-transparent body portion 13 is able to vibrate with a larger amplitude. Therefore, a waterdrop that has adhered to a surface of the light-transparent body portion 13 is able to be removed with greater certainty. It is preferable that the resonant frequency Fr1 in the first bending mode and the resonant frequency Fr2 in the second bending mode be close to each other. As is clear from FIG. 9 and FIG. 10, it is understood that, in a region in which the resonant frequency Fr1 in the first bending mode and the resonant frequency Fr2 in the second bending mode are close to each other, the amount of displacement in the first bending mode and the amount of displacement in the second bending mode both become large and reach their peak values. Consequently, the resonant frequency Fr1 in the first bending mode and the resonant frequency Fr2 in the second bending mode are preferably close to each other, and more specifically, it is preferable that the ratio of the absolute value of the difference between the resonant frequencies Fr1 and Fr2 to (Fr1+Fr2) be within a range of about ±10%, for example. As a result, a large amplitude is able to be obtained with certainty.

In the vibration device 2 according to the present preferred embodiment, a waterdrop is able to be removed by using vibration in the first bending mode, and a waterdrop straddling a node of vibration is able to be caused to move by using vibration in the second bending mode, so that the waterdrop coalesces with another waterdrop. This matter will now be described with reference to FIGS. 13A and 13B and FIGS. 14A to 14C.

Figure 13A:
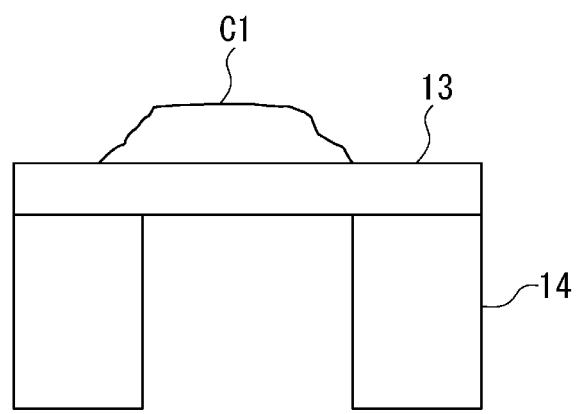
FIGS. 13A and 13B are schematic sectional front views each illustrating a process of removing a waterdrop in the vibration device according to the first preferred embodiment of the present invention.
Figure 13B:
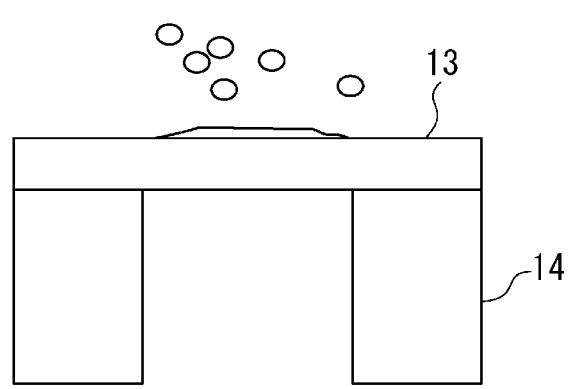
Figure 14A:
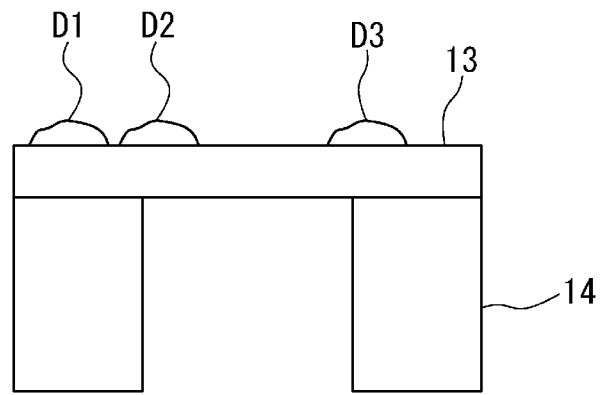
FIGS. 14A to 14C are schematic sectional front views each illustrating a process of removing a waterdrop in the vibration device according to the first preferred embodiment of the present invention.
Figure 14B:
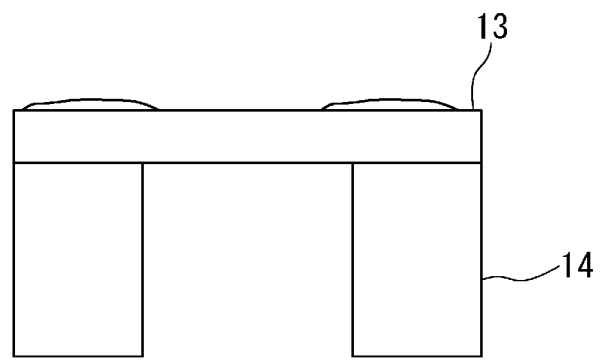
Figure 14C:
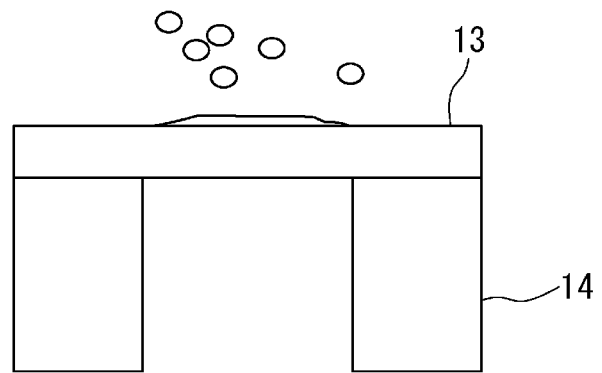

In FIG. 13A, a waterdrop C1 is adhered to the outer surface of the light-transparent body portion 13. In this state, the light-transparent body portion 13 is vibrated in the first bending mode. As a result, the waterdrop is atomized and removed as illustrated in FIG. 13B. In contrast, in FIG. 14A, small waterdrops D1, D2, and D3 are adhered to the surface of the light-transparent body portion 13. When the light-transparent body portion 13 is vibrated in the second bending mode, for example, the waterdrops D2 and D3 each straddling a node of vibration are caused to move. As a result, the waterdrops coalesce with one another as illustrated in FIG. 14B. After that, as illustrated in FIG. 14C, the light-transparent body portion 13 is vibrated in the first bending mode, so that the coalesced large waterdrop are able to be atomized and removed.

Therefore, it is preferable that the vibration device 2 according to the present preferred embodiment be caused to vibrate in the second bending mode and then vibrate in the first bending mode. In addition, it is more preferable to alternately repeat a process of driving in the first bending mode and a process of driving in the second bending mode. As a result, a waterdrop that is adhered to the outer surface of the light-transparent body portion 13 is able to be removed with greater certainty.

Figure 15:
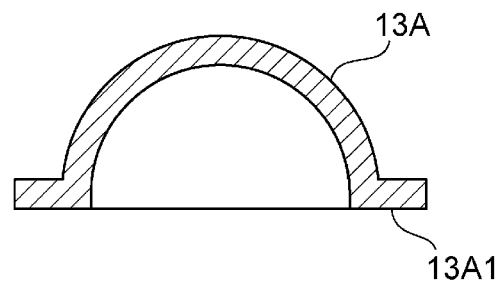
FIG. 15 is a sectional front view illustrating a modification of a light-transparent body portion according to a preferred embodiment of the present invention.
Figure 16:
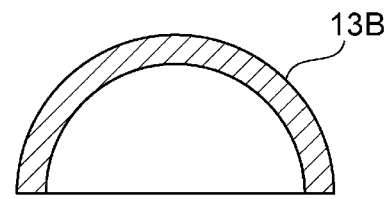
FIG. 16 is a sectional front view illustrating another modification of a light-transparent body portion according to a preferred embodiment of the present invention.

Note that, in the vibration device 2 according to the first preferred embodiment, although the light-transparent body portion 13 preferably has a flat plate shape, a light-transparent body portion 13A and a light-transparent body portion 13B each having a dome shape as illustrated in FIG. 15 and FIG. 16 may be used. In FIG. 15, the dome-shaped light-transparent body portion 13A includes a flange portion 13A1 provided at the outer peripheral edge thereof. In the case in which such a flange portion 13A1 is provided, a bottom surface of the flange portion 13A1 is connected to the end surface 14b of a cylindrical main body 14. As a result, a joint interface is provided.

Figure 17:
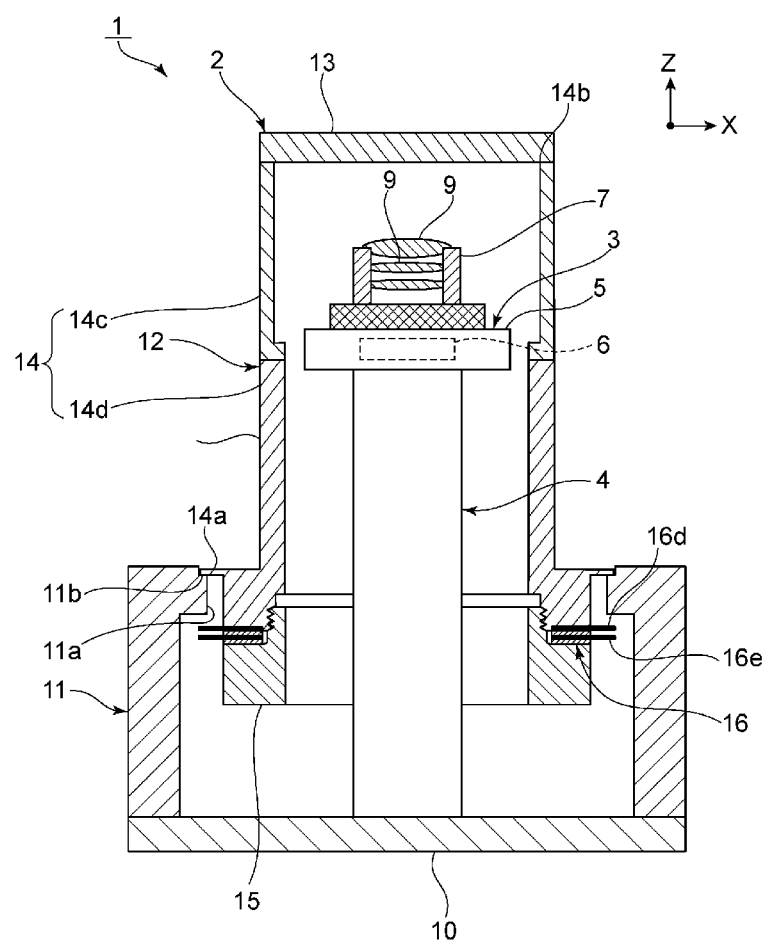
FIG. 17 is a schematic sectional front view illustrating structures of a light-transparent body portion and a cylindrical vibration body portion, which are included in a vibration device according to a second preferred embodiment of the present invention.

In addition, as the second preferred embodiment illustrated in FIG. 17, the cylindrical member 14 may include a mode-conversion coupling portion 14c and a cylindrical main body 14d. The mode-conversion coupling portion 14c also defines a thinned-wall portion. Consequently, an amplitude is able to be increased. Here, an end portion of the mode-conversion coupling portion 14c in the Z direction is an end portion of the cylindrical member 14. Thus, the end surface 14b is located at the end portion of the mode-conversion coupling portion 14c. In this case, the cylindrical main body 14d is vibrated in a vibration mode, such as breathing vibration by driving the piezoelectric vibrator 16. The mode-conversion coupling portion 14c converts the vibration mode into a vibration mode, such as stretching vibration in the Z direction. In this case, it is preferable to adjust the dimensions of the mode-conversion coupling portion 14c so as to set the resonance frequency in the mode-conversion coupling portion 14c to be the same or substantially the same as the resonance frequency of the cylindrical main body 14d. As a result, a mode conversion is performed, and the amplitude at the end surface 14b is able to be further increased.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration device used for a camera body that includes a lens, the vibration device comprising:
   a cylindrical vibration body portion including a cylindrical member that includes a first end portion, a second end portion, an end surface surrounding an opening at the first end portion, and a thinned-wall portion having a thickness in the first end portion is smaller than a thickness of the second end portion and a piezoelectric vibrator; and
   a light-transparent body portion including an outer peripheral portion connected to the end surface of the cylindrical member to define a joint interface and such that the light-transparent body portion covers the opening and a light-transparent portion positioned in front of the lens; wherein
   the light-transparent body portion is structured to vibrate in a bending mode by vibration of the cylindrical vibration body portion;
   the bending mode includes a first bending mode in which a center portion of the light-transparent body portion that is displaced to a largest extent when the light-transparent body portion vibrates in the bending mode and the outer peripheral portion of the light-transparent body portion that is connected to the end surface are displaced in same directions in a Z direction defined as a direction of a central axis of the cylindrical vibration body portion, and a second bending mode in which the center portion of the light-transparent body portion and the outer peripheral portion of the light-transparent body portion are displaced in opposite directions in the Z direction; and
   the outer peripheral portion of the light-transparent body portion is connected to the end surface of the cylindrical vibration body portion such that a node in the first bending mode and a node in the second bending mode are located within the joint interface between the end surface and the outer peripheral portion.

2. The vibration device according to claim 1, wherein the piezoelectric vibrator is disposed such that the cylindrical vibration body portion is displaced in the Z direction.

3. The vibration device according to claim 1, wherein the cylindrical member includes:
   a cylindrical main body; and
   a cylindrical mode-conversion coupling portion that is connected to the cylindrical main body and that includes the thinned-wall portion; and
   an end portion of the mode-conversion coupling portion, the end portion being opposite to an end portion of the mode-conversion coupling portion that is connected to the cylindrical main body, is a first end portion including the opening and the end surface.

4. The vibration device according to claim 1, wherein the piezoelectric vibrator has a cylindrical or substantially cylindrical shape.

5. The vibration device according to claim 1, wherein the cylindrical vibration body portion has a cylindrical or substantially cylindrical shape.

6. The vibration device according to claim 1, wherein the cylindrical member is made a metal or a synthetic resin.

7. The vibration device according to claim 1, wherein
   the cylindrical vibration body portion further includes a fixing member at the second end portion of the cylindrical member; and
   the piezoelectric vibrator is sandwiched between a top surface of the fixing member and a bottom surface of the cylindrical member.

8. The vibration device according to claim 1, wherein the piezoelectric vibrator includes an annular piezoelectric element including first and second annular piezoelectric plates that are polarized in opposite directions to one another.

9. A method of driving the vibration device according to claim 1, the method comprising:
   vibrating the light-transparent body portion in at least one of the first bending mode and the second bending mode; and
   driving the vibration device such that the node of vibration in the first bending mode and the node of vibration in the second bending mode are located within the joint interface.

10. The method of driving the vibration device according to claim 9, wherein the light-transparent body portion is vibrated in at least one of the first bending mode and the second bending mode such that a difference between a resonant frequency in the first bending mode and a resonant frequency in the second bending mode is reduced.

11. The method of driving the vibration device according to claim 9, wherein a process of vibrating the light-transparent body portion in the first bending mode and a process of vibrating the light-transparent body portion in the second bending mode are alternately repeated.

12. The method of driving the vibration device according to claim 9, wherein the piezoelectric vibrator is disposed such that the cylindrical vibration body portion is displaced in the Z direction during vibration of the light-transparent body portion.

13. A camera comprising:
   the vibration device according to claim 1.

14. The camera according to claim 13, wherein the piezoelectric vibrator is disposed such that the cylindrical vibration body portion is displaced in the Z direction.

15. The camera according to claim 13, wherein
   the cylindrical member includes:
      a cylindrical main body; and
      a cylindrical mode-conversion coupling portion that is connected to the cylindrical main body and that includes the thinned-wall portion; and
   an end portion of the mode-conversion coupling portion, the end portion being opposite to an end portion of the mode-conversion coupling portion that is connected to the cylindrical main body, is a first end portion including the opening and the end surface.

16. The camera according to claim 13, wherein the piezoelectric vibrator has a cylindrical or substantially cylindrical shape.

17. The camera according to claim 13, wherein the cylindrical vibration body portion has a cylindrical or substantially cylindrical shape.

18. The camera according to claim 13, wherein the cylindrical member is made a metal or a synthetic resin.

19. The camera according to claim 13, wherein
   the cylindrical vibration body portion further includes a fixing member at the second end portion of the cylindrical member; and
   the piezoelectric vibrator is sandwiched between a top surface of the fixing member and a bottom surface of the cylindrical member.

20. The camera according to claim 13, wherein the piezoelectric vibrator includes an annular piezoelectric element including first and second annular piezoelectric plates that are polarized in opposite directions to one another.

* * * * *